United States Patent [19]
Besmann et al.

[11] Patent Number: 6,037,073
[45] Date of Patent: *Mar. 14, 2000

[54] BIPOLAR PLATE/DIFFUSER FOR A PROTON EXCHANGE MEMBRANE FUEL CELL

[75] Inventors: Theodore M. Besmann; Timothy D. Burchell, both of Oak Ridge, Tenn.

[73] Assignee: Lockheed Martin Energy Research Corporation, Oak Ridge, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,513

[22] Filed: Oct. 15, 1996

[51] Int. Cl.$^7$ ........................................................ H01M 8/04
[52] U.S. Cl. .................................. 429/34; 429/38; 429/40
[58] Field of Search .................................. 429/38, 39, 40, 429/34

[56] References Cited

U.S. PATENT DOCUMENTS

| | | | |
|---|---|---|---|
| 4,169,917 | 10/1979 | Baker et al. | 429/39 |
| 4,489,142 | 12/1984 | Chi et al. | 429/38 |
| 4,579,789 | 4/1986 | Fukuda et al. | 429/39 |
| 4,580,524 | 4/1986 | Lackey et al. | 118/725 |
| 4,664,988 | 5/1987 | Shigeta et al. | 429/39 |
| 4,778,736 | 10/1988 | Kaji et al. | 429/39 |
| 5,075,160 | 12/1991 | Stinton et al. | 428/282 |
| 5,558,955 | 9/1996 | Breault et al. | 429/38 |

OTHER PUBLICATIONS

K. Kinoshita, F. R. McLarnon, and E.J. Cairns, *Fuel Cells: A Handbook*, DOE/METC–88/6096, pp. 2–4, Lawrence Berkeley Laboratory, Berkeley, CA, May, 1988.

R. Lemons, J. Eberhardt, A. Landgrebe, D. MacArthur, R. Savenell, S. Swathirajan, D. Wilson, and M. Wilson, "Batteries and Fuel Cells," *Current Status, Research Needs, and Opportunities in Applications of Surface Processing to Transportation and Utilities Technologies: Proceedings of a Dec. 1991 Workshop*, A. W. Czanderna and A.R. Landgrebe, Editors, NREL/CP–412–5007, pp. 21–1–21–14, National Renewable Energy Laboratory, Golden, CO. Sep. 1992.

M.C. Kimble and N.E. Vanderborgh, "Reactant Gas Flow Fields in Advanced PEM Fuel Cell Designs," *Proceedings of the 27th Intersociety Energy Conversion Engineering Conference*, vol. 3, pp. 3.413–3.417, Society of Automotive Engineers, Warrendale, PA (1992). (no month available K. Strasser, "PEM Fuel Cells for Energy Storage Systems," pp. 630–635, Proceedings of the 26th Intersociety Energy Conversion Engineering Conference, vol. 3, American Nuclear Society, La Grange Park, IL (1991). (no month available).

*Primary Examiner*—Maria Nuzzolillo
*Assistant Examiner*—Carol Chaney
*Attorney, Agent, or Firm*—Joseph A. Marasco

[57] ABSTRACT

A combination bipolar plate/diffuser fuel cell component includes an electrically conducting solid material having:
  a porous region having a porous surface; and
  a hermetic region,
    the hermetic region defining at least a portion of at least one coolant channel, the porous region defining at least a portion of at least one reactant channel, the porous region defining a flow field medium for diffusing the reactant to the porous surface.

6 Claims, 2 Drawing Sheets

BIPOLAR PLATE/DIFFUSER FOR A PROTON EXCHANGE MEMBRANE FUEL CELL

The United States Government has rights in this invention pursuant to contract no. DE-AC05-84OR21400 between the United States Department of Energy and Lockheed Martin Energy Systems, Inc., and contract no. DE-AC05-96OR22464 between the United States Department of Energy and Lockheed Martin Energy Research Corporation.

FIELD OF THE INVENTION

The present invention relates to fuel cells for producing electricity, and more particularly to monolithic combination bipolar plate and diffusers for such fuel cells.

BACKGROUND OF THE INVENTION

Fuel cells, especially proton exchange membrane fuel cells (PEMFC) are known to generally comprise a number of component layers that provide electrical contact (electrodes); channels for coolant, fuel, and oxidant; diffusion layers for dispersing the fuel and oxidant; a catalytic element for each pole; and the electrolyte membrane.

In the manufacture of such fuel cells, consideration of the cost of fabricating and assembling multiple components and the ohmic losses across interfaces would appear to encourage the combination of functions. Yet the components described above are currently produced as discrete elements that require assembly into a unit stack. Moreover, one of the most costly components is the bipolar plate, which is currently machined from graphite.

For further background information, please refer to the following publications:

1. Stinton, et al., U.S. Pat. No. 5,075,160, Dec. 24, 1991.
2. Lackey, et al., U.S. Pat. No. 4,580,524, Apr. 8, 1986.
3. K. Kinoshita, F. R. McLamon, and E. J. Cairns, Fuel Cells: A Handbook, DOE/METC-88/6096, pp. 2–4, Lawrence Berkeley Laboratory, Berkeley, Calif., May, 1988.
4. R. Lemons, J. Eberhardt, A. Landgrebe, D. MacArthur, R. Savenell, S. Swathirajan, D. Wilson, and M. Wilson, "Batteries and Fuel Cells," Current Status, Research Needs, and Opportunities in Applications of Surface Processing to Transportation and Utilities Technologies: Proceedings of a December 1991 Workshop, A. W. Czanderna and A. R. Landgrebe, Editors, NREL/CP-412-5007, pp. 21-1-21-14, National Renewable Energy Laboratory, Golden, Colo. September 1992.
5. M. C. Kimble and N. E. Vanderborgh, "Reactant Gas Flow Fields in Advanced PEM Fuel Cell Designs," *Proceedings of the 27th Intersociety Energy Conversion Engineering Conference*, Vol. 3, pp. 3.413–3417, Society of Automotive Engineers, Warrendale, Pa. (1992).
6. K. Strasser, "PEM Fuel Cells for Energy Storage Systems," pp. 630–635, Proceedings of the 26th Intersociety Energy Conversion Engineering Conference, Vol. 3, American Nuclear Society, La Grange Park, Ill. (1991).

OBJECTS OF THE INVENTION

Accordingly, objects of the present invention include the provision of a new and improved fuel cell in which the bipolar plate and diffuser are combined into a single monolithic component, two series cells (anode and cathode) are optionally combined into a single monolithic component, and simple geometry, resulting in less costly construction and lower ohmic losses.

Further and other objects of the present invention will become apparent from the description contained herein.

SUMMARY OF THE INVENTION

In accordance with one aspect of the present invention, the foregoing and other objects are achieved by a monolithic combination bipolar plate/diffuser fuel cell component which includes an electrically conducting solid material having a porous region having a porous surface and a hermetic region, the hermetic region defining at least a portion of at least one coolant channel, the porous region defining at least a portion of at least one reactant channel, the porous region defining a flow field medium for diffusing the reactant to the porous surface.

In accordance with another aspect of the present invention, a monolithic combination bipolar plate/diffuser fuel cell component includes an electrically conducting solid material having: a first porous region having a first porous surface; a second porous region having a second porous surface; and a hermetic region, the hermetic region defining at least one coolant channel, the first porous region defining at least a portion of at least one fuel channel, the second porous region defining at least a portion of at least one oxidant channel, the first porous region defining a flow field medium for diffusing the fuel to the first porous surface, the second porous region defining a flow field medium for diffusing the oxidant to the second porous surface.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
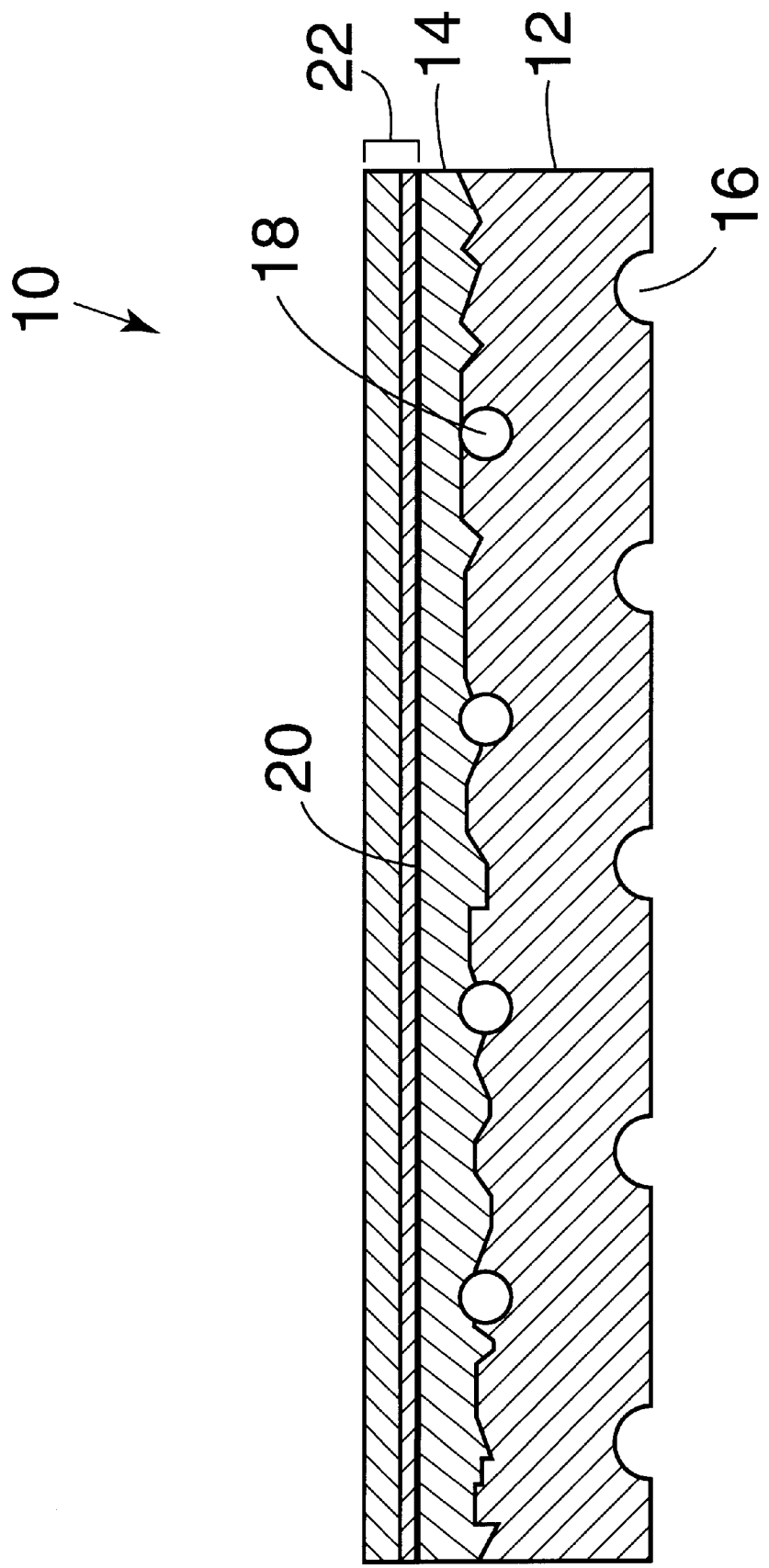
FIG. 1 is a sectional view of single monolithic combination electrode bipolar plate/diffuser in accordance with the present invention.

In a more simple embodiment of the present invention, shown in FIG. 1, a single monolithic electrode/diffuser fuel cell component 10 serves as both the bipolar plate and the diffuser thereof. The component 10 is initially fabricated from a conductive, porous base material, preferably a fibrous material, more preferably fibrous carbon. The base material is selected on the basis of porosity which has the appropriate diffusion characteristics for the fuel and oxidant. It should be apparent to the skilled artisan that various conventional base materials and fabrication techniques can be employed to fabricate a conductive monolithic having a selected porosity.

In the preferred embodiment of the present invention, the basic component material is molded to an appropriate shape by conventional slurry molding techniques using chopped or milled carbon fibers of various lengths. Such a method can be carried out as follows:

Step 1. An aqueous slurry is prepared which comprises a mixture of carbon fibers having lengths typically in the range of about 0.1 mm to about 100 mm and about 20 wt % to about 50 wt % phenolic resin powder binder.

Step 2. The slurry is forced through an appropriate mesh size screen to trap the solids, thus producing a wet monolithic which is subsequently dried at a temperature of less than 80° C. The initial porosity, in the slurry molded and dried condition, is typically in the range 70–90%.

Step 3. The dried monolith is further densified and the resin is cured via conventional means such as mechanical compression at low pressure in shaped graphite molds at a temperature in the range of about 120° C. to about 160° C., preferably about 130° C.

Step 4. The densified, cured monolith is pyrolized (carbonized) at a temperature in the range of about 700° C. to about 1300° C. in an inert environment. In the pyrolized condition the resultant total porosity is typically in the range of about 40% to about 60%, and the pore size range is typically about 10 to about 100 microns. This is a suitable pore structure for subsequent CVI processing to produce a hermetic region 12 while retaining sufficient open porosity in a region 14 remaining porous to allow diffusion of the reactant gasses through the bipolar plate.

A preferably planar region of the material is densified to a non-porous hermetic state and called the hermetic region 12 It is necessary to seal a region of the monolith that contains the coolant channels 18 in order to contain coolant therein and to prevent transport of fuel or oxidant toward the wrong electrode of the fuel cell. Densification to the hermetic state is preferably achieved via a conventional chemical vapor infiltration (CVI) technique.

For example, the porous region 14 which is not to be densified is masked via a conventional masking technique. The component is then contacted with a hydrocarbon gas, typically diluted in an inert gas, at reduced pressure and at a temperature in the range of about 800° C. to about 1500° C. The hydrocarbon infiltrates the exposed region of the component, reacts and deposits carbon on the fibers, and when sufficient deposition has occurred the region becomes hermetic. Infiltrated carbon further provides additional electrical conductivity.

The remaining region of undensified material remains porous and is called the porous region 14. The hermetic region defines coolant channels 16, and the porous region defines at least portions of reactant channels 18. The depth of the hermetic region 12 is controlled during fabrication to avoid surrounding (and subsequently sealing) the reactant channels 18. The hermetic region 12 acts as a seal, preventing any flow of reactant away from the porous surface 20 while also preventing any flow of coolant toward reactant channels 18 or porous surface 20. The porous region 14 further defines a flow field medium for diffusing a reactant (fuel or oxidant) to a porous surface 20 upon which is disposed a conventional catalyst/electrolyte arrangement 22.

The component is subsequently attached to the opposite electrode of a second cell in a conventional series. Coolant channels 16 can be formed as partial channels on a surface of the component as grooves which align with similar grooves in an opposing fuel cell component to form complete coolant channels. Thus it is seen that the present invention provides the combination of two components, the bipolar plate and the diffuser, into a single, simply fabricated monolithic component.

Another, more advanced embodiment combines two components as described above, as shown in FIG. 2. Back-to-back bipolar plate/diffusers are fabricated as one monolithic component, with coolant channels 32 formed as complete channels within the component, as well as reactant channels I& The hermetic region 34 defines coolant channels 32

Since there are two porous regions 36, 38 in this embodiment, CVI to form the hermetic region 34 is accomplished by flowing the stream of gaseous reactants through the coolant channels. Fuel channels 40 and oxidant channels 42 are at least partially defined by the two respective porous regions 36, 38 which further define flow field media for diffusing a fuel and oxidant in opposite directions to respective porous surfaces 44,46 upon which are disposed respective catalyst/electrolyte arrangements 48, 50. Thus it is seen that the present invention further provides the combination into one component of two opposing combination bipolar plate/diffuser components taught in the first embodiment; i.e., two sets of bipolar plates and diffusers-four discrete components-have been combined into one component.

Figure 2:
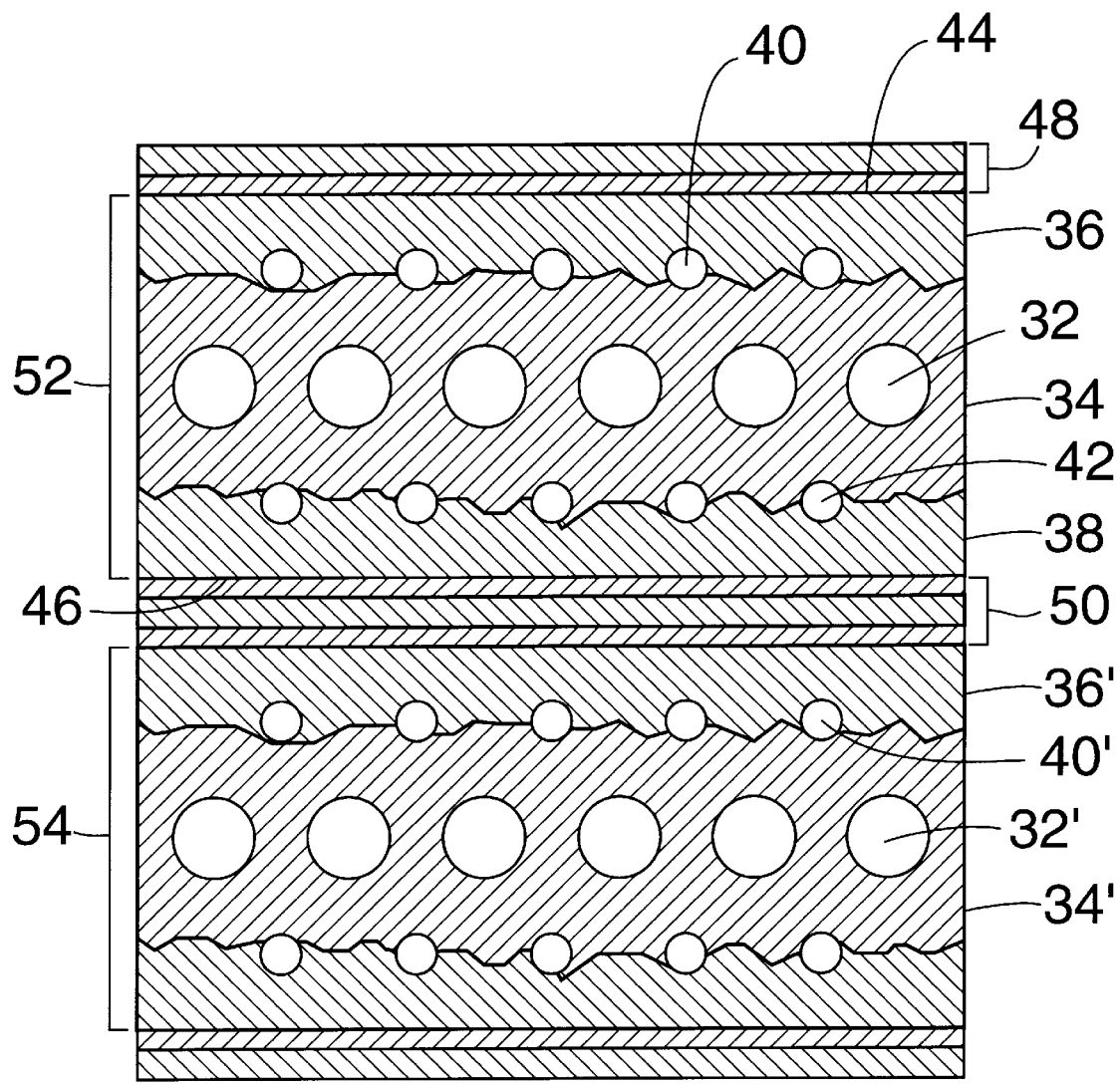
FIG. 2 is a sectional view of stacked fuel cells using a series of monolithic anode and cathode bipolar plate/diffusers in accordance with the present invention.

FIG. 2 further shows two such components 52,54 in a stacked arrangement. Fuel from a fuel channel 40 of one component 54 and oxidant from an oxidant channel 42 of the next component 52 flow toward each other and react at the catalyst/electrolyte arrangement 50 to produce electricity. The simplicity of such an arrangement is evidenced in that the only two components necessary to complete a cycle in the stack are the bipolar plate/diffusers 52, 54 and the catalyst/electrolyte arrangements 48, 50.

The advantages of the invention include avoidance of deleterious fluid leaks and ohmic losses generally associated with conventional discrete bipolar plate and diffuser arrangements which require multiple discrete components for each cycle in the stack thereof.

The monolithic bipolar -plate/diffuser component is of benefit for low-cost, high volume production of PEMFCs. These are useful in stationary power production facilities, direct electric transportation vehicles, auxiliary power for transportation vehicles, and backup power systems.

While there has been shown and described what are at present considered the preferred embodiments of the invention, it will be obvious to those skilled in the art that various changes and modifications can be made therein without departing from the scope of the inventions defined by the appended claims.

What is claimed is:

1. A combination bipolar plate/diffuser fuel cell component comprising a monolith of electrically conducting fibrous carbon material having:

a porous region having a porous surface; and a hermetic region infiltrated with a densified carbon material, said hermetic region defining at least a portion of at least one coolant channel, said porous region defining at least a portion of at least one reactant channel, said porous region defining a flow field medium for diffusing the reactant to said porous surface.

2. A component in accordance with claim 1 wherein said porous region and said hermetic region are generally planar.

3. A component in accordance with claim 1 further comprising a solid catalyst/electrolyte arrangement disposed in operable communication with said porous surface.

4. A combination bipolar plate/diffuser fuel cell component comprising a monolith of electrically conducting fibrous carbon material having:
- a first porous region having a first porous surface;
- a second porous region having a second porous surface; and
- a hermetic region infiltrated with a densified carbon material, said hermetic region defining at least one coolant channel, said first porous region defining at least a portion of at least one fuel channel, said second porous region defining at least a portion of at least one oxidant channel, said first porous region defining a flow field medium for diffusing the fuel to said first porous surface, said second porous region defining a flow field medium for diffusing the oxidant to said second porous surface.

5. A component in accordance with claim 4 wherein said porous region and said hermetic region are generally planar.

6. A component in accordance with claim 4 further comprising a solid catalyst/electrolyte arrangement disposed in operable communication with said porous surface.

* * * * *